Figure 1:
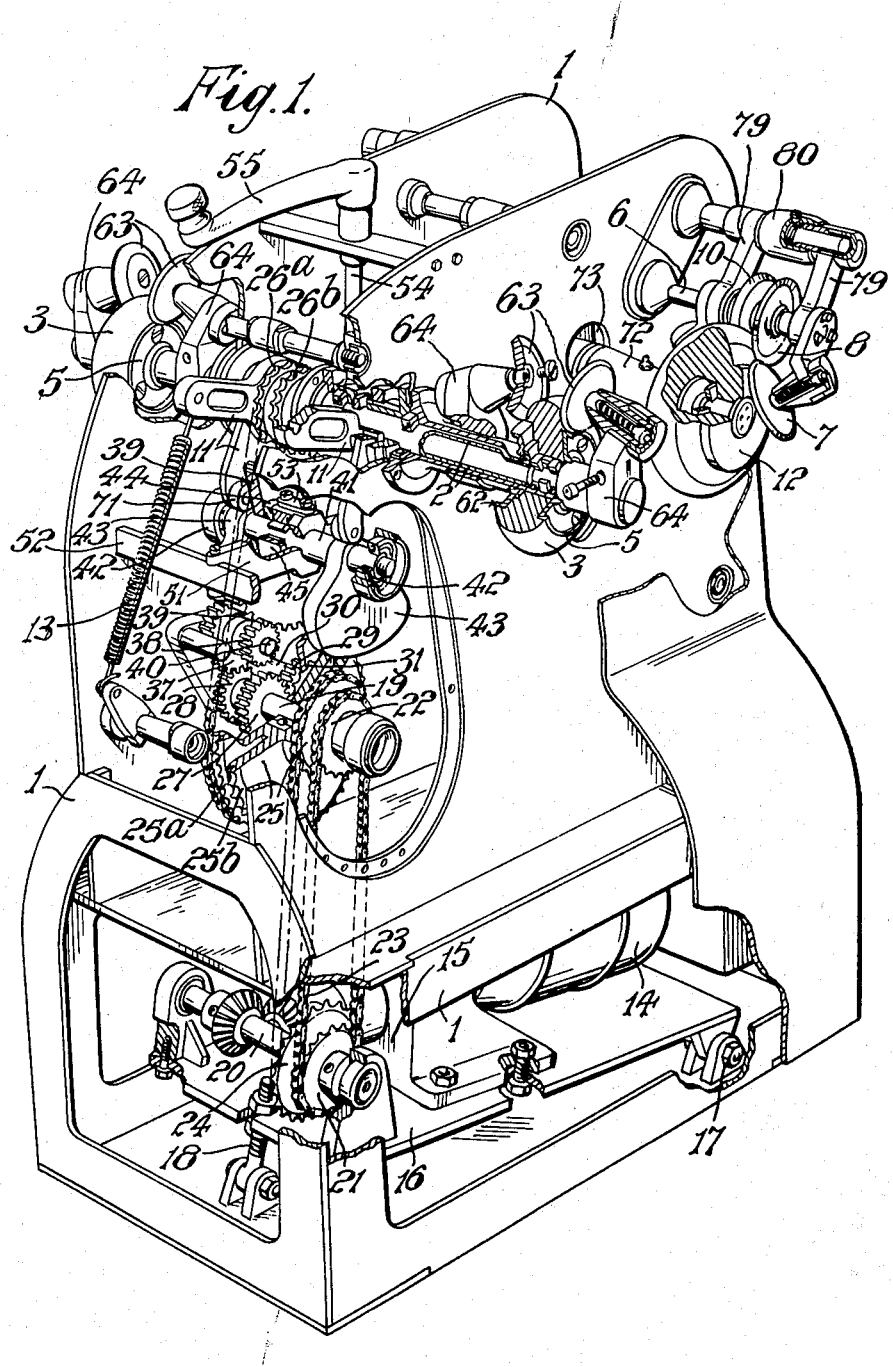

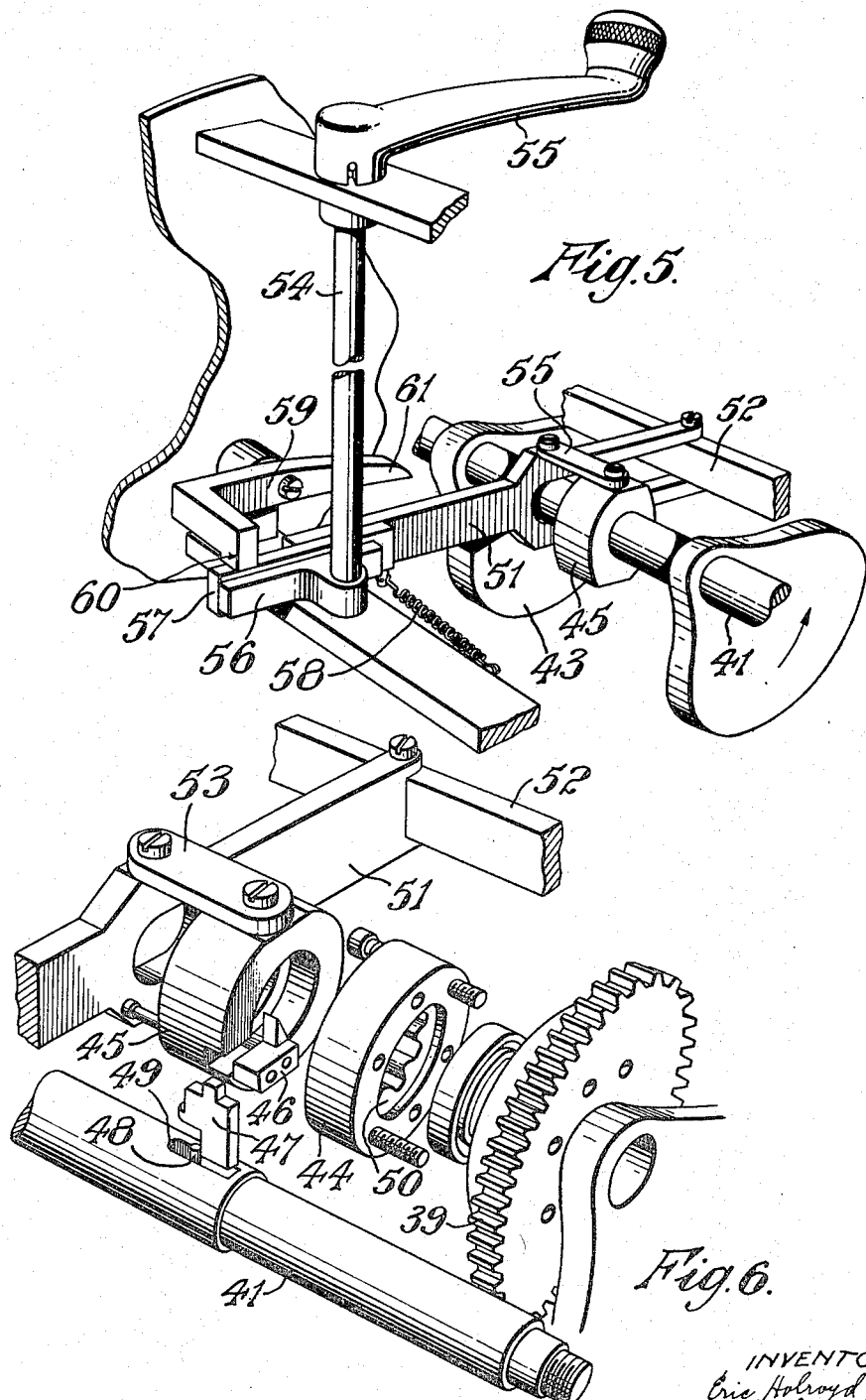

United States Patent Office 2,733,765
Patented Feb. 7, 1956

2,733,765

APPARATUS FOR TRIMMING MOULDING SPEW FROM TIRE COVERS

Eric Holroyd, Speke, Liverpool, and Leslie Malcolm Pearce, Liverpool, England, assignors to Dunlop Tire and Rubber Corporation, Buffalo, N. Y., a corporation of New York Application June 3, 1952, Serial No. 291,422

Claims priority, application Great Britain June 16, 1951

9 Claims. (Cl. 164—10.2)

This invention relates to apparatus for trimming moulding spew from tire covers.

Owing to the considerable pressure applied to cycle tire covers during moulding and vulcanization, moulding spew is formed on each shoulder of the tire (i. e. between the tread portion and each of the sidewalls) and on each tire bead. Each moulding spew extends circumferentially around the tire in the form of an annulus integral with the tire and hitherto has been removed by means of scissors, which is a tedious operation and requires considerable skill.

Our invention provides apparatus for automatically trimming moulding spew from tire covers which requires no skill to operate and which is capable of trimming spew from a tire cover at a greater rate than is possible by hand.

According to our invention apparatus for trimming moulding spew from a tire cover comprises means for rotatably supporting a tire cover, a pair of rotatable circular trimming knives disposed with their axes relatively inclined whereby a portion of a face of one knife adjacent to its periphery overlaps and contacts the corresponding portion of the other knife, means for urging the knives together so that they drivably contact, means for rotatably driving one of the knives, and means for relatively moving the knives and a tire cover carried by said supporting means into a position for the knives to trim moulding spew from the tire cover.

Preferably the apparatus comprises two pairs of circular trimming knives each adapted to trim separate spews and the means for rotatably supporting the tire cover comprises a power driven pulley adapted to engage the inside of the cover.

In a preferred construction two pairs of circular trimming knives are provided for the tread spews and a further two pairs of knives are provided for the bead spews, and the means for effecting contact between the tread spew trimming knives and a tire cover mounted on the supporting means comprises a freely rotatable pulley adapted to engage the inside of the cover, said pulley being mounted on a pivoted arm so as to be movable towards and away from the knives.

The two pairs of bead-spew trimming knives comprise a circular trimming knife mounted on each side of the power driven pulley, and drivable thereby, the periphery of each knife projecting axially beyond the radially extending face of the pulley and being disposed so as to locate with a tire bead supported by the pulley, and each knife being adapted to engage a bead spew so that, in conjunction with a co-operating circular trimming knife a portion of a face of which adjacent to its periphery overlaps and is in driving contact with the corresponding portion of the pulley knife the bead spew is trimmed from the tire.

The two pairs of tread spew trimming knives are of the type fully described in our co-pending application Serial No. 291,421, filed June 3, 1952.

Figure 2:
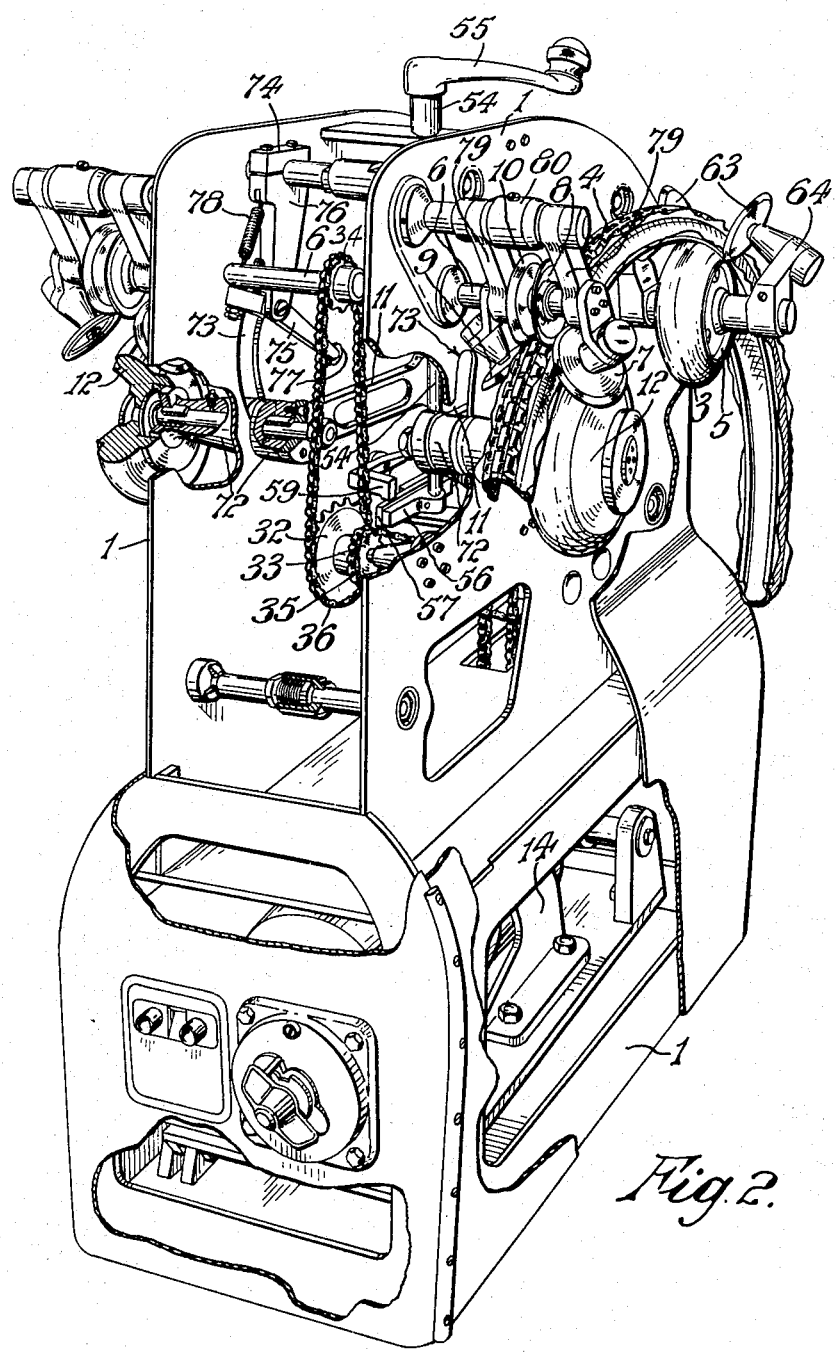
Figure 3:
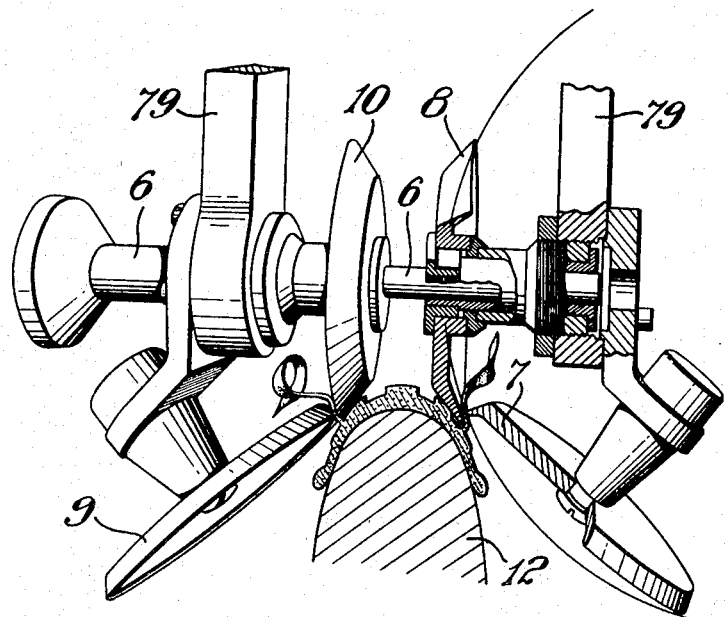
Figure 4:
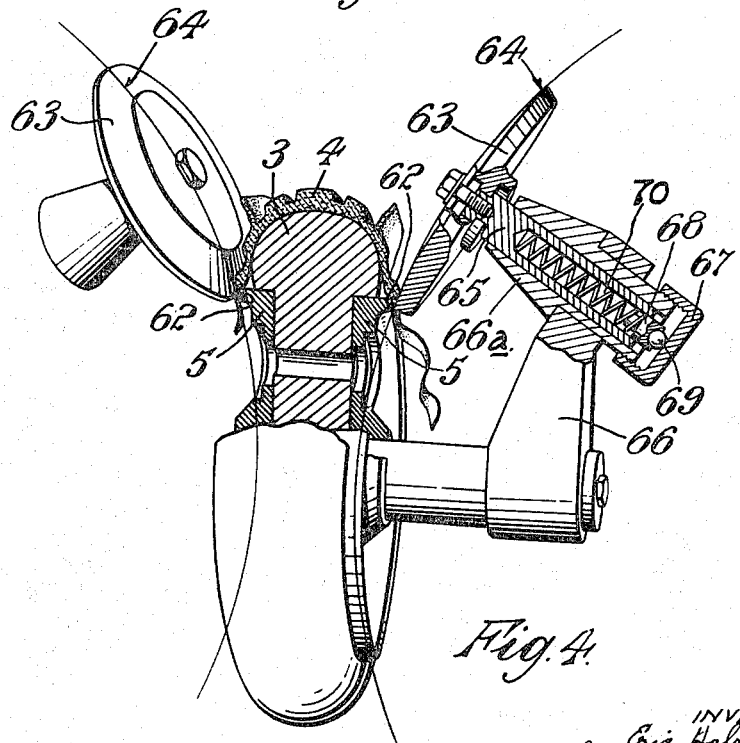

The invention will now be more particularly described with reference to the accompanying drawings in which Fig. 1 is a perspective view of apparatus for simultaneously trimming moulding spew from the shoulders and beads of two cycle covers, Fig. 2 is a perspective view of apparatus illustrated in Fig. 1, viewed from the right of Fig. 1, Fig. 3 is a detailed perspective view of the circular tread trimming cutters shown in Figures 1 and 2, Fig. 4 is a detailed perspective view of the circular bead trimming cutters shown in Figures 1 and 2, Fig. 5 is a detailed perspective view of the clutch actuating and locking mechanism shown in Fig. 2, Fig. 6 is an exploded perspective view of the clutch assembly.

The apparatus comprises essentially a machine frame 1, a horizontally mounted, hollow, pulley-driving shaft 2 having at each end a driven pulley 3 for rotating a cycle tire 4, Figs. 2 and 4, each pulley having a pair of circular bead spew trimming knives 5 (one for each spew of a single tire, see Fig. 4) located on each side of the pulley as will be more fully described hereinafter.

The apparatus further comprises a second horizontally mounted, power driven shaft 6 having at each end two pairs of tread spew trimming knives 7, 8, 9 and 10 for each tread spew of a single tire (see Fig. 3) of the type fully described in our co-pending patent application Serial No. 291,421.

The apparatus comprises, in addition, a pair of spring loaded pivotally mounted actuating arms 11 each carrying a freely rotatable pulley 12 at one end and having a spring 13 attached to the other, each arm being movable so as to carry a tire into contact with two pairs of the tread spew trimming knives 7, 8, 9 and 10. An electric motor 14 is adjustably mounted on the machine frame 1 and provides a continuous drive for the tread and bead spew trimming knives and provides the means for intermittently moving the actuating arms 11 through a hand-actuating clutch and a cam mechanism (see Fig. 5) described hereinafter.

The apparatus will now be more particularly described.

The electric motor 14 and a gear box 15 therefor are mounted on a horizontally disposed platform 16 mounted on hinges 17 on a horizontal plate at one end and supported at the other on a turn-buckle 18. The motor drives a horizonally mounted sprocket shaft 19 through the intermediate shaft 20 and the sprockets 21 and 22 and chain 23. A sprocket 24 mounted on the intermediate shaft 20 drives a sprocket unit 25 which is freely rotatable on the sprocket shaft 19.

The sprocket unit 25 is driven by the motor at a different speed from the speed of the sprocket shaft 19 and comprises a pair of double sprocket wheels 25a and 25b rigidly mounted on a common hub which is freely rotatable on the sprocket shaft. The double sprocket wheels 25a and 25b drive a pair of double sprocket wheels 26a and 26b rigidly mounted on the pulley driving shaft 2.

The sprocket shaft 19 carries two driving pinions 27 and 28. The pinion 27 drivably engages a gear wheel 29 mounted on a shaft 30 which also carries a sprocket wheel 31 for driving the shaft 6 for the tread spew trimming knives through the intermediate sprockets 32, 33 and 34 and chains 35 and 36 (see Fig. 2). The sprockets 32 and 33 are mounted in an eccentrically bored bearing which is rotatable so as to tension the chains 35 and 36.

The pinion 28 drivably engages the gear wheel 37 mounted on a shaft 40 which also carries a pinion 38. The pinion 38 drivably engages a gear wheel 39 rigidly mounted on a horizontal cam shaft 41.

The horizontally mounted camshaft 41 is freely rotatable in bearings 42 mounted in the machine frame 1 and is provided with a pair of cams 43 rigidly attached to the camshaft in spaced apart relationship for the purpose which will be described hereinafter. An internally toothed clutch member 44 is rigidly attached co-axially to the gear wheel 39. Figure 6 illustrates the member 44 separated from the gear 39 and the camshaft 41 is shown located alongside (instead of coaxially within) the gear 39 and the member 44. A housing 45 is mounted co-axially on the camshaft 41 and supports a key-actuating member 46. The shaft adjacent to the member 46 is provided with a key 47 mounted in a recess 49 in the shaft and urged radially outwardly by means of a spring 48, the key actuating member 46 normally engaging with the key 47 so as to retain the key in the recess 49 and out of engagement with the internal teeth 50 provided in the member 44. The housing 45 is movable, so as to cause the member 46 to engage or disengage the key 47, by means of the lever 51 pivoted on the bar 52 and the pair of connecting levers 53 (only one of which is illustrated in the drawings).

The lever 51 is movable by means of the mechanism illustrated in Figure 5. A vertical operating rod 54 has a handle 55 attached to one end and a flat-faced actuating block 56 rigidly keyed to the other end. The actuating block 56 operates against a block 57 rigidly attached to the lever 51, the block 57 being held in contact with the actuating block 56 by means of the tension spring 58. A pivoted catch 59 has a head portion 60 which is movable into engagement with the block 57, so as to hold the lever 51 in a position wherein the key actuating member 46 is disengaged from the key 47, by means of the adjacent cam 43 which engages the end 61 of the pivoted catch 59. The catch operates as will be hereinafter described so as to cause the key to be re-engaged by the member 46 after a single rotation of the camshaft 51.

The horizontally mounted hollow pulley-driving shaft 2 is located above the camshaft 41, each of the pulleys 3, rigidly keyed to the ends of the shaft 2, having a circular trimming knife 5 set into each face. Each knife is provided with a substantially radially extending face 62 projecting axially beyond the radially extending face of the pulley. A freely rotatable circular trimming knife 63 mounted on a bracket 66 is located on each side of the pulley 3, the axes of these knives 63 being inclined to the axis of an associated pulley-mounted knife 5 so that a part-spherical substantially radially extending face 64, Fig. 4, of each knife 63 engages, under the pressure of a spring 70, with the face 62 formed on the associated pulley-mounted knife. The arrangement is illustrated in Fig. 4, and shows the knives 63 mounted on a shaft 65 rotatable in an eccentrically bored bearing 66a mounted in a housing formed in the bracket 66. An end cap 67 retains a plunger 68 and ball bearing 69 in contact with the spring 70 and provides for the adjustment of the spring tension.

The pulley driving shaft 2 also carries the pair of actuating arms 11 which are freely rotatable thereon and mounted one on each side of the pair of double sprocket wheels 26a and 26b. Each arm is provided between its ends with a cam follower 71 attached to the arm and contacting the peripheral surface of one of the cams 43. Each cam follower is held in contact with the peripheral surface of the cam by means of one of the tension springs 13. The other end of each spring is rigidly attached to the frame 1.

The end of each actuating arm is provided with a pulley support 72 extending at right angles to the length of the arm and projecting through an arcuate slot 73 formed in the adjacent frame. One of the freely rotatable pulleys 12 already referred to is mounted on the end of each support 72.

A damping mechanism 74 is provided for each actuating arm 11 and is illustrated in Figure 2 and they serve to prevent the actuating arms from moving inwardly towards the camshaft too rapidly under the influence of the springs 13 and the cams 43. The damping mechanism 74 comprises a lever 75 pivoted between its ends on a bracket 76, the lever being provided at one end with a freely rotatable roller 77 and at the other end with a tension spring 78. When the actuating arms 11 move upwardly so as to carry the pulleys 12 towards the tread trimming knives 7, 8, 9 and 10 the rollers 77 engage with the arms, and the springs 78 are placed under tension so as to resist excessively rapid movement of the arms 11.

Two pairs of circular tread spew trimming knives 7, 8, 9 and 10 are mounted at each end of the power driven shaft 6 as will now be described. Each pair of circular trimming knives is mounted on a supporting member 79 and each pair comprises a driving and a driven knife of the kind described in our co-pending application Ser. No. 291,421. The driving knives 8 and 10 are mounted coaxially and driven by the driven shaft 6. The supporting members 79 are movable towards and away from one another by means of a turnbuckle 80 whereby the distance between the knives 8 and 10 is adjustable. Each driven knife 7 and 9 is mounted on its supporting member with its axis inclined to the axis of its associated driving knife 8 and 10 and engages with this knife as is fully described in the co-pending application referred to above. The driven knives are mounted in eccentrically bored bearings and are spring loaded in the manner already described in connection with the driven knives for the bead spew.

Each freely rotatable pulley 12 is movable by its actuating arm into a position in which the pulley is symmetrically located between the two pairs of tread spew trimming knives.

The operation of the apparatus just outlined will now be described. With the acutating arms 11 in a position wherein the freely rotatable pulleys 12 are located in a position remote from their associated tread-spew trimming knives 7, 8, 9 and 10, two untrimmed cycle tires are mounted one on each side of the machine so that each tire engages with and is carried by one of the driven pulleys 3 and by one of the freely rotatable pulleys 12. The electric motor 14 is then started and each of the tires is rotated by its driven pulley. Although the bead spew is located adjacent to the bead-spew trimming knives 5 and 63, this spew is not trimmed from the tire because the tire is supported by the pulleys in a position such that the "angle of entry" of the spew relative to the trimming knives is incorrect. Trimming of the tread-spew can take place on neither of the tires each of which is supported by a freely rotatable pulley in a position clear of the tread-spew trimming knives 7, 8, 9 and 10.

In order to commence trimming, the handle 55 is rotated in order to disengage the key-actuating member 46 and key 47 so that the key engages with one of the internal teeth 50 of the member 44. This causes the member 44 to rotate the camshaft 41. When rotation commences, the handle is released, the block 57 being engaged by the head portion 60 of the pivoted catch 39 which is actuated by the adjacent cam 43. After the camshaft has rotated for a part of a revolution the cam 43 disengages the catch 59 and the blocks 56 and 57 move together under the tension of the spring 58. This moves the key-actuating member 46 into a position adjacent to the key 47 so that when a single revolution of the camshaft has been completed the key will be disengaged from its associated internal tooth.

When the camshaft revolves the springs 13 and the cames 43 actuate the followers 71 so as to raise the freely rotatable pulleys 12 which carry the cycle tires into engagement with the tread spew cutters 7, 8, 9 and 10 (see Fig. 3), and under the restraint of the damping mechanism 74. Each rotating cycle tire is then carried past the two pairs of tread-spew trimming knives so as to effect trimming. Movement of the tires into the tread spew trimming position adjusts the "angle of entry" of the bead spew relative to the trimming knives and bead-spew trimming takes place simultaneously with the tread-spew trimming.

Each cycle time completes something more than a single revolution while the camshaft completes a single revolution, and as the camshaft completes its revolution the cams 43 actuate their associated followers in order to actuate the arms so as to move the cycle tires clear of the tread-spew trimming knives. After the camshaft has completed a single revolution it is disengaged from its drive in the manner already described.

The trimmed tires are then removed from the pulleys 3 and 12 and a fresh pair of untrimmed cycle tires is located on the pulleys in their stead. The trimming operation just described is then repeated, the cycle of events being initiated by a further movement of the handle 55.

Each freely rotatable pulley 12 is movable axially to a limited extend on its pulley support 72 so that a tire mounted thereon is capable of aligning itself symmetrically between the pairs of tread spew trimming knives 7, 8, 9 and 10 when moved into contact therewith.

The turn-buckle 80 for varying the distance between the supporting members 79 and thus between the tread-spew trimming knives is provided so that tires of varying width between tread shoulders can be trimmed by the apparatus just described.

In order to make a similar adjustment to the bead-spew trimming knives, packing may be inserted between the pulley 3 and the knives 5 so as to increase the overall width between corresponding substantially radially extending faces of these knives. This adjustment, for a given change of width of tire to be accommodated, need not be so great as the adjustment required for the tread-spew trimming knives on account of the relatively greater flexibility of a tire between beads than between shoulders. The flexibility is sufficient to allow the beads to be forced slightly inwardly and together by the bead spew trimming knives 63 so that the necessary amount of adjustment to these knives is reduced.

Having described our invention, what we claim is:

1. Apparatus for trimming molding spew from a tire cover which comprises a pulley to enter a tire cover and support it from within, a driven rotatable disc knife spaced from said pulley and tire cover, a support for said pulley movable relatively to said knife to a position to support the outer face of said tire cover tangent to the face of said knife with the spew of the tire cover at the cutting edge of the knife, a second knife having a cutting edge intersecting and overlapping the driven cutting knife at said spew and in spring pressed contact with the intersecting and overlapping area of said first rotatable knife.

2. Apparatus for trimming molding spew from a tire cover which comprises a pair of pulleys rotating in a common plane on spaced axes each said pulley having a periphery to enter a tire cover and support it from within, one of said pulleys being driven in rotation, a pair of spew cutting rotating knives for each pulley, one of said knives being a driven rotatable knife spaced from said pulley and the second knife being rotatable and having a cutting edge and margin intersecting and overlapping the cutting edge and a part of the edge margin of the driven knife and in spring pressed contact therewith and supports for said pulleys movable to bring a part of a tire cover thereon tangent to the face of said driven knife adjacent its cutting edge.

3. Apparatus for trimming molding spew from a tire cover which comprises a power driven pulley which conforms to and is drivably engageable by a tire cover to enter a tire cover and support it from within, each side of said pulley having a circular spew cutting knife rigidily attached co-axially thereto, the periphery of each knife projecting axially beyond the radially extending face of the pulley and being so disposed as to locate with a bead of a tire cover supported by the pulley, and a cooperating driven knife for each of the co-axial knives disposed with its axis inclined relative to the cutting knife and having a portion of its face adjacent to its periphery overlapping and in contact with the corresponding portion of one of the co-axial knives, and spring pressed means urging each of the driven knives into driving contact with its associated co-axial knife.

4. Apparatus of claim 3 wherein each of the spring pressed knives is mounted on an adjustable bracket, each bracket being rotatable about the axis of the co-axial knives so as to alter the angular position of the mutually contacting portions of the knives relative to a radius of one knife.

5. Apparatus according to claim 3 wherein each of the spring pressed knives is mounted in a housing carrying an accentrically bored bearing which is rotatable in the housing whereby the spring pressed knife is movable relative to the pulley knives so as to increase or decrease the mutually contacting areas of the knives.

6. The apparatus of claim 3 having a second tire supporting pulley, a lever supporting said pulley to move it in the same plane as the first pulley, a pair of circular, tread spew trimming knives, one having a face tangent to a tire cover mounted on said second pulley when said pulley is moved by said lever into contact with said knife and the other having a cutting edge overlapping the cutting edge of the first knife.

7. Apparatus for trimming molding spew from a tire cover which comprises a power driven pulley which conforms to the contour of the inner face of a tire cover to enter said cover and support and rotate it from within, a driven rotatable knife spaced from said pulley and tire cover, a suport for said pulley movable relatively to said knife to a position to support the outer face of said tire cover tangent to the face of said knife with a spew of the tire cover at the cutting edge of the knife, a second knife having a cutting edge intersecting and overlapping the driven cutting knife at said spew and in spring pressed contact with the intersecting and overlapping area of said driven cutting knife, the marginal areas of said knives adjacent their cutting edges having complementary spherical curvatures.

8. The apparatus of claim 1 in which said support for said pulley comprises a pivoted arm and in which said apparatus comprises a cam to rock said arm toward and from said knife, a driving connection movable to engage and drive said cam and a catch to hold said driving connection and positioned to be released by said cam upon the completion of a rotation.

9. The apparatus of claim 7 having a driving mechanism comprising a clutch to engage and disengage said cam, manual means to engage said clutch and means operable by said cam to disengage said clutch at the end of a rotation of said cam.

References Cited in the file of this patent

UNITED STATES PATENTS

| Number | Name | Date |
|---|---|---|
| 62,486 | Hatch | Feb. 26, 1867 |
| 1,412,951 | Maxwell | Apr. 18, 1922 |
| 1,417,627 | Putt | May 30, 1922 |
| 1,462,478 | Beynon et al. | July 24, 1923 |
| 1,527,194 | Kelley | Feb. 24, 1925 |
| 1,642,998 | Mason | Sept. 20, 1927 |
| 1,676,807 | Stevens | July 10, 1928 |
| 1,781,396 | Krause | Nov. 11, 1930 |
| 2,187,211 | McKinley et al. | Jan. 16, 1940 |